3,415,811
ANTIBIOTIC LINCOMYCIN K AND PROCESS
FOR THE PRODUCTION THEREOF
Alexander D. Argoudelis and Donald J. Mason, Kalamazoo, Mich., assignors to The Upjohn Company, Kalamazoo, Mich., a corporation of Delaware
Continuation-in-part of application Ser. No. 387,776, Aug. 5, 1964. This application Sept. 28, 1964, Ser. No. 399,802
16 Claims. (Cl. 260—210)

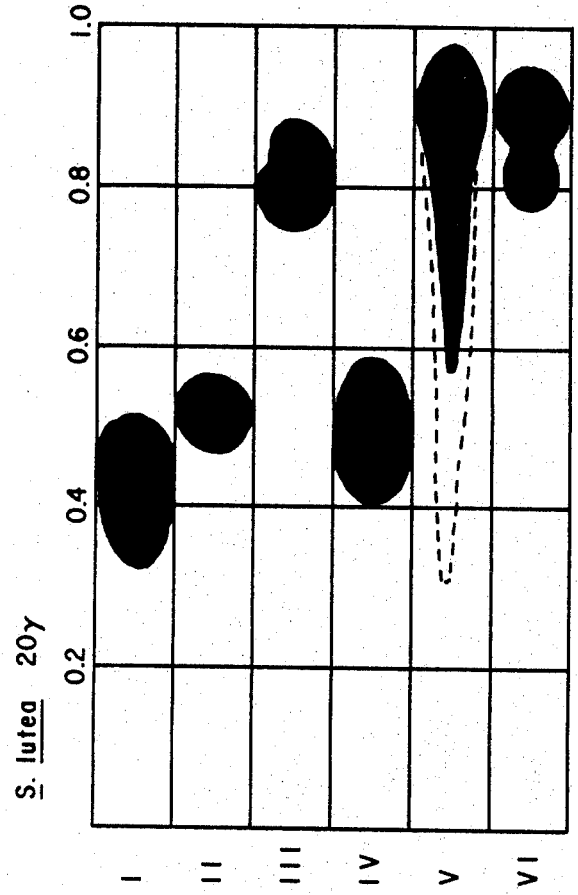

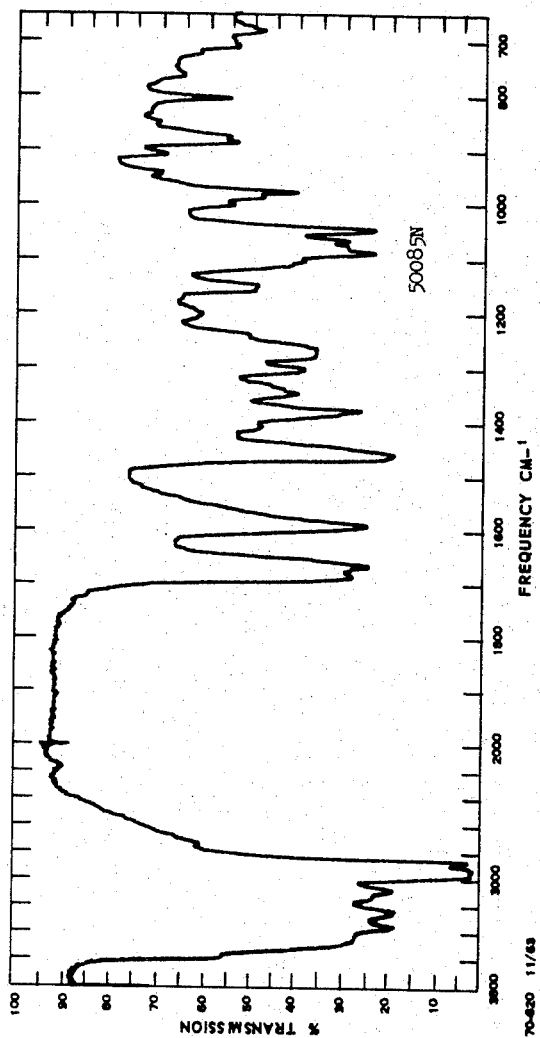

ABSTRACT OF THE DISCLOSURE

Antibiotic lincomycin K produced by a lincomycin-producing actinomycete when ethyl thiolincosaminide is added to a lincomycin fermentation. Lincomycin K is a basic compound and has the same antibacterial spectrum as lincomycin.

This invention relates to a novel composition of matter and to a process for the preparation thereof. More particularly this invention relates to a new compound, lincomycin K (U–20,943), and to a process for the production thereof.

Lincomycin K is a biosynthetic product produced by a lincomycin-producing actinomycete when ethyl thiolincosaminide (ETL) is added to the fermentation described in Example 1 of U.S. Patent 3,086,912 for the production of lincolnensin, also called lincomycin. ETL is obtained by hydrazinolysis of lincomycin C.

Lincomycin K is a basic compound and has the same antibacterial spectrum as lincomycin. Therefore, it can be used in the same manner as lincomycin. For example, it is useful in wash solutions, for sanitation purposes, as in the washing of hands and cleaning of equipment, floors or furnishings of contaminated rooms; it is also useful as an industrial preservative, for example, as a bacteriostatic rinse for laundered clothes and for impregnating paper and fabrics; and it is useful for suppressing the growth of sensitive organisms in plate assays, and other biological media. It can also be used as a feed supplement, to promote the growth of mammals and birds, either alone or in combination with other antibiotics.

Lincomycin and lincomycin K are similar in some respects, such as both antibiotics have one basic titratable group with similar pKa values and very close equivalent weights; and both antibiotics do not show any absorption in the U.V. region. However, they are demonstrably different compounds as shown by their solubilities in various solvents, optical rotation, I.R. absorption spectra and thin-layer chromatography using a solvent system consisting of methyl ethyl ketone, acetone, water (150:50:20, by volume).

The novel compound of the invention can be produced in a fermentation as described in Example 1, U.S. Patent 3,086,912 when an effective amount of ethyl thiolincosaminide (ETL) ranging from more than incidental impurities of 0.75 gm./liter up to 8 gm./liter of fermentation medium is used. The ETL can be in the medium initially, or it can be fed to the culture during the fermentation. The feeding can be done continuously, semi-continuously or by other means as long as the concentration of ETL in the fermentation medium does not affect the growth of the microorganism to the point where the production of lincomycin K suffers. Preferably, the feeding is commenced when the fermentation is 24 to 48 hours old. The toxic level of ETL will vary with equipment and media used, but in general a level at any particular time during the fermentation less than about 3 gm./liter of fermentation medium is not toxic. Therefore, a feeding schedule for ETL can be used whereby the level of ETL in the fermentation is never greater than 3 gm./liter at any particular time. As this level is increased, and again depending on the equipment and media used, some toxicity manifestations, such as reduced mycelial growth, may be observed. When the mycelial growth is significantly depressed by the additions of ETL, then, ordinarily, a noticeable drop in the fermentation yield of lincomycin K will be observed. ETL is not considered to be an extremely toxic fermentation additive in the sense that, for example, phenylacetic acid is to the penicillin fermentation. Therefore, even if 8 gm./liter of ETL is fed into the fermentation at one time, lincomycin E would still be produced in the fermentation.

The new compound of the invention is a nitrogeneous base having the molecular formula $$C_{18}H_{34}N_2O_6S \cdot HCl \cdot H_2O$$

It is mono-basic, has a pKa of about 8.0, and under ordinary conditions is more stable in the protonated, that is, salt form. It is soluble in water, lower-alkanols, e.g., methanol, ethanol, and the like; and relatively insoluble in lower-alkyl esters of lower alkanoic acids, e.g., ethyl acetate, butyl acetate, amyl acetate, and the like; lower-alkanones, e.g., acetone, methyl ethyl ketone, isopropyl butyl ketone, and the like; and chlorinated lower-alkanes, e.g., methylene chloride, chloroform, ethylene dichloride, and the like. It is insoluble in ether and benzene.

When ethyl thiolincosaminide (ETL) is added to a lincomycin fermentation such as disclosed in U.S. Patent 3,086,912, lincomycin K and some lincomycin are produced. A preferred method for the recovery of lincomycin K is by the use of a liquid cation exchanger. The first step of said process comprises contacting the beer with a water-immiscible liquid cation exchanger comprising at least one water-immiscible organic diluent and at least one oil-soluble salt of an aromatic sulfonic acid, said acid having one to 2 aromatic rings and at least one alkyl moiety, there being in total at least 15 alkyl carbon atoms when the acid contains one aromatic ring and at least 8 alkyl carbon atoms when the acid contains 2 aromatic rings. The second step of said process comprises contacting the loaded liquid cation exchanger resulting from the first step with a mixture of water and at least one stripping agent selected from the group consisting of amines, water-soluble acid addition salts thereof, and water-soluble quaternary ammonium salts, at a pH less than about 7. The resulting aqueous solution can then be used directly as a convenient source of the nitrogen-basic material, or the nitrogen-basic material can be separated from the aqueous solution in free base form or as an acid addition salt by methods known in the art. As mentioned above, the water-immiscible liquid cation exchanger of the novel process of this invention comprises at least one water-immiscible organic diluent and at least one oil-soluble salt of an aromatic sulfonic acid. A water-immiscible diluent is one which forms a two-phase liquid system in contact with an equal volume of water. Examples of suitable water-immiscible organic diluents are the alkanes, e.g., pentane, hexane, heptane, octane, and the like, especially the commercially available mixtures of isomeric hexanes and heptanes; cycloalkanes, e.g., cyclohexane, methylcyclohexane, and the like; aromatic hydrocarbons, e.g., benzene, toluene, the xylenes, the trimethylbenzenes, ethylbenzene, cymene, cumene, tetrahydronaphthalene, and the like; halogenated hydrocarbons, e.g., dichloromethane, chloroform, carbon tetrachloride, 1,2-dichloroethane, 1,1,2,2-tetrachloroethane, chlorobenzene, dichlorobenzenes, and the like; ethers, e.g., diethyl ether, diisopropyl ether, and the like; esters, e.g., ethyl acetate, butyl acetate, methyl benzoate, and the like; and nitro compounds, e.g., nitromethane, nitrobenzene, and the like. Dichloromethane is especially preferred as an organic diluent. The cation portion of the oil-soluble sulfonic acid salt can be any of a large variety of metal cations. Alkali metal cations, e.g., sodium, potassium and ammonium ions, and alkaline earth metal cations, e.g., magnesium, calcium, and barium ions, are preferred, but other metal cations, e.g., aluminum, zinc, and copper ions, are also suitable. The anion portion of the oil-soluble sulfonic acid salt can correspond to any of a large variety of aromatic sulfonic acids or mixtures thereof. Preferred sulfonic acids are those obtained by sulfonation of mono- or polyalkylbenzenes or naphthalenes. Such sulfonic acids and their oil-soluble salts are well known to those skilled in the art and many are readily available from commercial sources. Further procedures are necessary to effect a separation of lincomycin and lincomycin K. This can be done, conveniently, by repeated extractions at an alkaline pH of a solution containing the two antibiotics. A solvent for lincomycin, for example, a chlorinated lower-alkane, such as methylene chloride can be used. These solvent extracts contain predominantly lincomycin. The remaining aqueous solution, which contains predominantly lincomycin K with traces of lincomycin, advantageously, can be extracted repeatedly with a solvent for lincomycin K for example, a water-immiscible lower alkanol, such as n-butyl alcohol. The solvent extracts can be subjected to further purification procedures, for example, counter current distribution, partition chromatography on silica or diatomaceous earth, advantageously, using solvents for lincomycin K, as disclosed above, and water mixtures as the eluting agents, adsorption chromatography on suitable adsorbents, for example, Florisil (a synthetic silicate of the type described in U.S. Patent 2,393,625 and sold by the Floridin Company), alumina, and carbon with elution of the lincomycin K therefrom, advantageously, with solvents for lincomycin K, as mentioned above.

Fractional liquid-liquid extraction is accomplished in partition chromatographic columns or in a counter current distribution apparatus using solvent systems such as n-butyl alcohol and water (1:1).

Crystallization of lincomycin K can be accomplished, conveniently, by dissolving a purified salt preparation of lincomycin K in water and adding a lower alkanone, for example, acetone.

Recrystallization is accomplished by dissolving the crystalline salt in water, adding a water-miscible solvent, e.g., acetone, methanol, ethanol, or 2-propanol, and cooling to induce or complete crystallization. The crystals are filtered and washed with aqueous solvents, and, if desired, by anhydrous solvent and then vacuum dried.

The new compound of the invention can also be recovered from filtered fermentation beer by adsorption on cation exchange resins. Both the carboxylic and sulfonic acid types can be used. [Suitable carboxylic acids resins include the polyacrylic acid resins obtained by the copolymerization of acrylic acid and divinylbenzene by the procedure given on p. 87 of Kunin, Ion Exchange Resins, 2nd ed. (1958), John Wiley and Sons, Inc. Carboxylic acid cation exchange resins of this type are marketed under the trade names Amberlite IRC–50 and Zeokarb 226. Suitable sulfonic acid resins include nuclear sulfonated polystyrene resins cross-linked with divinylbenzene which are obtained by the procedure given on p. 84 of Kunin, supra. Sulfonated cation exchange resins of this type are marketed under the trade names Dowex 50, Amberlite IR–120, Nalcite HCR, Chempro C–20, Permutit Q, and Zeokarb 225.]

The antibiotic is eluted from the resin with an acid, advantageously at a pH lower than the pKa of the cation exchange resin used. Satisfactory results are obtained with a pH of about 1 to 6. The eluate is adjusted to about pH 7.5 to 8.5 with a base, e.g., sodium hydroxide, or a strongly basic anion exchange resin. [Suitable anion exchange resins for this purpose are obtained by chloromethylating the procedure given on pp. 88 and 97 of Kunin, supra, polystyrene cross-linked, if desired, with divinylbenzene, prepared by the procedure given on p. 84 of Kunin, supra, and quaternizing with trimethylamine or dimethylthanolamine by the procedure given on p. 97 of Kunin, supra. Anion exchange resins of this type are marketed under the trade names Dowex 2, Dowex 20, Amberlite IRA–400, Duolite A–102, and Permutit S–1.]

The novel compound of the invention can be purified by successive transfers from protonated to non-protonated forms and vice versa, especially with other types of treatments intervening, as for example, solvent extractions and washings, chromatography and fractional-liquid-liquid extractions. In this manner salts of lincomycin K can be employed to isolate or upgrade the antibiotic. For example, the antibiotic can be converted to an insoluble salt, such as the picrate, which can be subjected to purification procedures and then used to regenerate the antibiotic free base by treatment with alkali. Or the antibiotic can be converted to a water-soluble salt, such as the hydrochloride or sulfate, and the aqueous solution of the salt extracted with various water-immiscible solvents before regenerating the antibiotic free base by treatment with alkali of the thus-extracted acid solution.

Salts of lincomycin K can be used for the same biological purposes as the free base or they can be employed to upgrade the antibiotic as previously described.

Specific acid salts can be made by neutralizing the free base with an appropriate acid to below about pH 7.0, and advantageously to about pH 2 to pH 6. Suitable acids for this purpose include hydrochloride, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2 - cyclohexanedicarboxylic, 4 - cyclohexenecarboxylic, octadecenylsuccinic, octenylsuccinic, methanesulfonic, benzenesulfonic, helianthic. Reinecke's, dimethyldithiocarbamic, sorbic, monochloroacetic, undecylenic, 4'-hydroxyazobenzene-4-sulfonic, octadecylsulfuric, picric, benzoic, cinnamic, and like acids.

Lincomycin K can be used in hospital laboratories to isolate *Klebsiella pneumoniae* from swabs or body exudates of patients in which mixed populations of certain other organisms, such as *Bacillus subtilis* and *Straphylococcus aureus* are present. The latter organisms are relatively susceptible to lincomycin K, whereas *K. pneumoniae* is relatively resistant, and when an appropriate concentration of lincomycin K is present in the medium, *K. pneumoniae* will grow where *B. subtilis* or *S. aureus* will not. The new compound can also be used to inhibit gram-positive, spore-former spreaders on agar plates when isolating molds, yeasts, actinomycetes, and gram-negative organisms. It can be used, for example, in the isolation of mircoorganisms in soil samples as well as in the isolation of gram-negative organisms, for example, Pseudomonas, Proteus, and *Escherichia coli* from mixed infections in the presence of Staphylococci or Streptococci.

The following examples are illustrative of the process and products of the present invention but are not to be construed as limiting. All percentages are by weight and all solvent mixture proportions are by volume unless otherwise noted.

EXAMPLE 1.—LINCOMYCIN K (A) Fermentation

A soil slant of *Streptomyces lincolnensis* var. *lincolnensis*, NRRL 2936, was used to inoculate a series of 500-ml. Erlenmeyer flasks each containing 100 ml. of sterile seed medium consisting of the following ingredients:

Gm.
Yeastolac[1] _____ 10
Glucose monohydrate _____ 10
N–Z Amine B[2] _____ 5
Tap water, q.s., 1 liter.

[1] Yeastolac is a protein hydrolyzate of yeast cells.
[2] N–Z Amine B is Sheffield's enzymatic digest casein.

The seed medium post sterilization pH was 7.2. The seed was grown for 3 days at 28° C. on a Gump rotary shaker operating at 250 r.p.m. with a 2½ inch stroke.

A 5% inoculum of the seed described above (150 ml.) was used to inoculate thirty 500-ml. Erlenmeyer flasks each containing 100 ml. of the following sterile fermentating medium:

| | |
|---|---|
| Glucose monohydrate | gm__ 15 |
| Starch | gm__ 40 |
| Molasses | gm__ 20 |
| Pharmamedia[1] | gm__ 25 |
| Calcium carbonate | gm__ 8 |
| Ucon[2] | ml__ 2 |
| Tap water, q.s., 1 liter. | |

[1] Pharmamedia is a cottonseed derived protein material.
[2] A synthetic polyalkylene glycol produced by Union Carbide Chemical Co., New York 17, N.Y.

Before sterilization, the pH was adjusted to 7.2 with a 50% solution of sodium hydroxide.

Two grams/liter of ETL was fed into the above fermentation at 48 hours. (In similar fermentations, levels of ETL as high as 8 grams/liter were fed to produce lincomycin K.)

The culture was grown for 120 hours at a temperature of 28° C., on a Gump rotary shaker agitated at a rate of 250 r.p.m. The preharvest whole broth assay against *S. lutea* was 735 mcg./mg.

The assay against *Sarcina lutea* is conducted on agar buffered to pH 6–8 with pH 7.0 phosphate buffer (0.1 M). A unit volume (0.08 ml.) of solution containing the material to be assayed is placed on a 12.7 mm. assay disc which is then placed on an agar plate seeded with the assay microorganism.

(B) Recovery

Fermentation beer (2.5 liters) was filtered, using diatomaceous earth as filter aid. The cake was washed with water and the wash was combined with the filtrate. The combined filtrate and wash (3.12 liters) was adjusted to pH 6.0 with 1 N aqueous hydrochloric acid and extracted with 1,500 ml. of Skellysolve B (isomeric hexanes). The Skellysolve B extract was discarded. The spent aqueous was then extracted with two 400-ml. portions of a 9% solution of sodium dinonyl naphthalene sulfonate (DNNSA) in Skellysolve B. The spent aqueous was discarded. The DNNSA extract (ca. 800 ml.) was washed with 200 ml. of water. The water wash was discarded. The DNNSA extract was then mixed with 350 ml. of water and 90 ml. of Aliquat 336 (tricapryl, ethyl ammonium chloride). The aqueous phase was separated and the spent DNNSA extract was extracted two additional times with the same portions as above of Aliquat 336 and water. The spent DNNSA was discarded. The aqueous extracts were combined, and the combined solution was extracted with two 200-ml. portions of Skellysolve B. The Skellysolve extract was discarded. The aqueous solution was adjusted to pH 10.0 with 1 N aqueous sodium hydroxide and extracted with three 500-ml. portions of methylene chloride. The methylene chloride extracts were combined and the combined solution (1,400 ml.) was concentrated to dryness. The residue was dissolved in 5 ml. of 1 N aqueous hydrochloric acid, and this solution was mixed with acetone (120 ml.) and ether (50 ml.). The precipitated crystalline material (600 mg.) was found to consist mainly of lincomycin. The spent aqueous (from the above methylene chloride extraction) was then extracted five times with 400-ml. portions of 1-butanol. The remaining spent aqueous was discarded. The butanolic extracts were combined, and this solution was mixed with 200 ml. of water and adjusted to pH 1.0 by using 1 N aqueous hydrochloric acid. The mixture was then concentrated to a volume of 40 ml. This solution containing some crystalline lincomycin K hydrochloride was mixed with 400 ml. of acetone. The precipitated material was separated by filtration and dried; yield 4.0 g. This material was dissolved in 60 ml. of water of water and mixed with 800 ml. of acetone. The crystalline lincomycin K hydrochloride and a small amount of impurity was separated by filtration (420 mg.). An additional 200 mg. of lincomycin K hydrochloride and a small amount of impurity was obtained from the filtrate. These preparations were combined (620 mg.) and dissolved in 18 ml. of water. Acetone (180 ml.) was added and colorless crystals were filtered off and dried (360 mg.). An additional 140 mg. of crystals were obtained from the filtrate. These preparations (360 mg. and 140 mg.) were found (by thin layer chromatography) to contain a second bio-active component in addition to lincomycin K. Separation of these compounds was achieved by counter current distribution which is described below.

(C) Counter current distribution

The starting material (360 mg. and 140 mg. combined) was dissolved in the lower phase (80 ml.) of the system 1-butanol-water (1:1 v./v.). The solution was mixed with equal amounts of upper phase and the system was equilibrated. The phases were added to an all-glass 2 ml./phase counter current distribution apparatus and the distribution started and completed after 1,000 transfers. Solids determination showed the following:

| Tube No. | Solid (mg./tube) | Tube No. | Solid (mg./tube) |
|---|---|---|---|
| 10 | | 150 | 3.67 |
| 20 | | 160 | 6.19 |
| 30 | | 170 | 9.00 |
| 40 | | 180 | 10.55 |
| 50 | | 190 | 8.60 |
| 60 | 0.46 | 200 | 0.93 |
| 70 | 0.06 | 210 | 0.31 |
| 80 | 0.28 | 220 | 0.23 |
| 90 | 0.81 | 230 | 0.25 |
| 100 | 1.39 | 240 | 0.23 |
| 110 | 1.84 | 250 | 0.39 |
| 120 | 1.11 | 260 | 0.51 |
| 130 | 1.02 | 270 | 0.23 |
| 140 | 1.45 | 280 | 0.32 |

Thin layer chromatography showed that tubes 140–210 contained lincomycin K. The solution in these tubes was concentrated to dryness and the residue was dissolved in 12 ml. of water. Addition of successive amounts of acetone (i.e., 70 ml., 30 ml., 100 ml.) gave crystalline preparations of 44 mg., 236 mg., and 54 mg. These preparations were combined and recrystallized from 32 ml. of water and 392 ml. of acetone to give 270 mg. of lincomycin K hydrochloride crystals.

The ethyl thiolincosaminide used in Example I was prepared in the following manner from lincomycin C.

A soil slant of *Streptomyces lincolnensis* var. *lincolnensis*, NRRL 2936, was used to inoculate a series of 500-ml. Erlenmeyer flasks each containing 100 ml. of seed medium consisting of the following ingredients:

| | Gm. |
|---|---|
| Yeastolac | 10 |
| Glucose monohydrate | 10 |
| N–Z amine B | 5 |
| Tap water, q.s., 1 liter. | |

The seed medium presterilization pH was 7.3. The seed was grown for 2 days at 28° C. on a Gump rotary shaker operating at 250 r.p.m.

A 5% inoculum of the seed described above (5 ml.) was added to each of thirty 500-ml. Erlenmeyer flasks each containing 100 ml. of the following fermentation medium:

| | |
|---|---|
| Glucose monohydrate | gm__ 15 |
| Starch | gm__ 40 |
| Molasses | gm__ 20 |
| Wilson's Peptone Liquor No. 159[1] | gm__ 10 |
| Corn steep liquor | gm__ 20 |
| Calcium carbonate | gm__ 8 |
| Lard oil | ml__ 0.5 |
| Tap water, q.s., 1 liter. | |

[1] Wilson's Peptone Liquor No. 159 is a preparation of enzymatically hydrolyzed proteins from animal origin.

At the time of inoculation, DL-ethionine was added to a final concentration of 2 mg./ml.

The shake flasks were harvested after 4 days of fermentation at 28° C. on a Gump rotary shaker at 250 r.p.m. They assayed 200 mcg./ml. on the *S. lutea* assay, hereinafter described. The whole beer solids was about 20 gm./liter.

In a similar manner, fermentations were run with L-ethionine substituted for DL-ethionine, and D-ethionine substituted for DL-ethionine to produce lincomycin C.

Whole beer (236 liters) from a DL-ethionine fermentation was filtered at harvest pH using a filter aid as required. The mycelial cake was washed with water and the cake was then discarded. The filtered beer and water wash (275 liters) was stirred for 45 minutes with 12.5 kg. of activated carbon and 2.5 kg. of diatomaceous earth. The mixture was filtered and the filtrate was discarded. The carbon cake was washed with 60 liters of water and the water wash was discarded. The cake was washed with 70 liters of 20% aqueous acetone and the 20% aqueous acetone wash was discarded. The cake was then eluted twice with 100-liter portions of 90% aqueous acetone. The eluates were combined (215 liters) and the solution was concentrated (18 liters). This concentrate was adjusted to pH 10.0 with a 50% aqueous sodium hydroxide solution and extracted three times with 20-liter portions of methylene chloride. The methylene chloride extracts were combined (60 liters) and then concentrated to give an oily preparation (7.14 g.) containing lincomycin and lincomycin C in equal amounts and both in the free base form. This preparation was then dissolved in 200 ml. of methylene chloride. The solution was clarified by filtration and then concentrated to dryness in vacuo. The residue was dissolved in 100 ml. of 1 N methanolic hydrogen chloride. The methanolic solution was then mixed with 3.2 liters of ether under stirring. The resulting precipitated colorless, crude lincomycin hydrochloride and lincomycin C hydrochloride was isolated by filtration and dried; yield 7.14 g. assaying 940 mcg./mg. against *Sarcina lutea*. Thin layer chromatography showed the presence of both lincomycin hydrochloride and lincomycin C hydrochloride in approximately equal amounts.

Crude lincomycin C hydrochloride (7.0 g.), as obtained above, was dissolved in 20 ml. of water and 20 ml. of butanol, pH adjusted to 4.2 with 1 N HCl, and the solution distributed in a counter current distribution apparatus for 1,000 transfers. Analysis by thin-layer chromatography showed that the fractions in tubes 135 to 190 contained lincomycin C. These fractions were combined, and the solution was concentrated to an aqueous and freeze dried to give 2.44 gm. of lincomycin C hydrochloride assaying 1400 mcg./mg. against *Sarcina lutea*. Five hundred mg. of this preparation was dissolved in 2 ml. of water, 1 ml. of methanol, and 100 ml. of acetone. The solution was clarified by filtration. The filtrate was mixed with ether until crystals appeared. The mixture was allowed to stand at room temperature for 1 hour. Crystalline (cubes) lincomycin C hydrochloride was separated from the supernatant material solution by decantation. These crystals were recrystallized from 1 ml. of water, 1 ml. of methanol, 80 ml. of acetone and 20 ml. of ether; yield, 250 mg. of crystalline (cubes) lincomycin C hydrochloride. The supernatant (obtained as described above) was allowed to stand at 5° C. for 4 hours. Crystalline (needles) lincomycine C hydrochloride which precipitated was filtered and dried; yield, 150 mg. of crystalline (needles) lincomycin C hydrochloride.

Lincomycin C hydrochloride (2 g.) was dissolved in 50 ml. of water. The pH of the solution was adjusted to 9.5 by the addition of an anion exchange resin in the hydroxide form. (An anion exchange resin obtained by chloromethylating by the procedure given on pp. 88 and 97 of Kunin, supra, polystyrene cross-linked, if desired, with divinylbenzene, prepared by the procedure given on p. 84 of Kunin, supra, and quaternizing with trimethylamine or dimethylethanolamine, by the procedure given on p. 97 of Kunin, supra.) The alkaline solution was then freeze dried to a residue which was dissolved in 50 ml of hydrazine hydrate (98–100%) and refluxed for 24 hours. The solution was then concentrated to dryness in vacuo and the residue triturated three times with 10-ml. portions of acetonitrile. The insoluble material was collected and dried; yield 900 mg. A solution of 600 mg. of the dried insoluble material in 4 ml. of dimethylformamide (heat was used to promote solution) was then clarified by filtration and the filtrate was held at room temperature for 4 hours. The crystalline ethyl thiolincosaminide which precipitated was isolated by filtration, washed with ether and dried; yield 500 mg.

CHARACTERIZATION OF LINCOMYCIN K HYDROCHLORIDE

U.V. absorption spectrum: Lincomycin K hydrochloride does not show any absorption maxima in the range of 220–400 mμ.

Titration: Potentiometric titration shows the presence of one basic titratable group with a pKa of 8.0.

Solubility: Lincomycin K hydrochloride is soluble in water, lower-alkanols, e.g., methanol, ethanol, and the like. It is relatively insoluble in lower-alkanones, e.g., acetone, methyl ethyl ketone, isopropyl n-butyl ketone, and the like; lower-alkyl esters of lower-alkanoic acids, e.g., ethyl acetate, n-butyl acetate, amyl acetate, and the like; chlorinated lower-alkanes, e.g., methylene chloride, chloroform, ethylene dichloride and the like; ether, and benzene.

Molecular weight: Found 450±10 (by potentiometric titration).

Papergram: The paper chromatographic pattern of lincomycin K hydrochloride in the following solvent systems is as shown in FIGURE I of the drawing:

(I) 1-butanol, water (84:16), 16 hours.
(II) 1-butanol, water (84:16) plus 0.25% p-toluene-sulfonic acid, 16 hours.
(III) 1-butanol, acetic acid, water (2:1:1), 16 hours.
(IV) 2% piperidine (v./v.) in n-butanol, water (84:16), 16 hours.
(V) 1-butanol, water (4:96), 5 hours.
(VI) 1-butanol, water (4:96) plus 0.25% p-toluene-sulfonic acid, 5 hours.

Crystal appearance: White needles.
Specific rotation: $[\alpha]_D^{25} = +157°$ (c., 0.507, water).
Elemental analysis: Calcd. for $C_{18}H_{34}N_2O_5S \cdot HCl \cdot H_2O$: C, 46.84; H, 8.11; N, 6.08; S, 6.96; Cl, 7.70; O, 24.31. Found: C, 46.86; H, 8.53; N, 6.05; S, 7.12; Cl, 7.44; O, 24.00 (by diff.).

Infrared absorption spectrum: The infrared absorption spectrum of lincomycin K hydrochloride in mineral oil mull, as shown in FIGURE II of the drawing, in reciprocal centimeters is as follows:

| | |
|---|---|
| 3575 (M) | 1204 (W) |
| 3430 (S) | 1198 (W) |
| 3335 (S) | 1154 (M) |
| 3230 (S) | 1145 (M) |
| 3115 (S) | 1107 (M) |
| 3065 (S) | 1100 (M) |
| 2940 Nujol | 1085 (S) |
| 2915 Nujol | 1072 (S) |
| 2835 Nujol | 1060 (M) |
| 2720 (W) | 1042 (S) |
| 2160 (W) | 991 (M) |
| 1682 (S) | 982 (M) |
| 1662 (S) | 972 (M) |
| 1587 (S) | 955 (W) |
| 1456 Nujol | 939 (W) |
| 1443 (S) | 903 (W) |
| 1405 (M) | 880 (M) |

| | |
|---|---|
| 1393 (M) | 870 (M) |
| 1373 (S) | 845 (M) |
| 1365 Nujol | 798 (M) |
| 1342 (M) | 757 (W) |
| 1298 (M) | 717 Nujol |
| 1273 (M) | 704 (M) |
| 1262 (M) | 678 (M) |
| 1235 (M) | 670 (M) |

Band intensitites in the above I.R. spectrum are indicated as S, M, W, respectively, and are approximated in terms of the backgrounds in the vicinity of the bands. An S band is of the same order of intensity as the strongest band in the spectrum, M bands are between ⅓ and ⅔ as intense as the strongest band, and W bands are less than ⅓ as intense as the strongest band.

Lincomycin K is thought now to be ethyl 6-(trans-4-propyl - L - prolylamino) - 6,8 - dideoxy - 1 - thio - D-erythro-α-galacto octo-pyranoside of the formula:

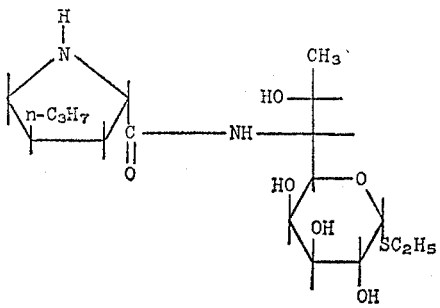

and to this extent is a continuation-in-part of copending application Ser. No. 387,776, filed Aug. 5, 1964.

We claim:
1. A compound, lincomycin K having the structural formula:

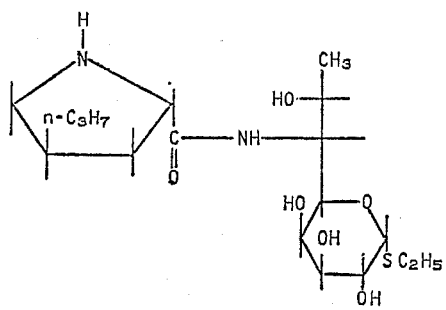

2. A composition of matter consisting of a member of the group consisting of lincomycin K, as defined in claim 1 and the acid addition salts thereof.

3. The hydrochloride salt of the compound defined in claim 1.

4. The acid addition salt of the compound defined in claim 1.

5. A compound according to claim 4 in its essentially pure crystalline form.

6. The compound according to claim 3 in its essentially pure crystalline form.

7. A process which comprises cultivating Streptomyces lincolnensis var. lincolnensis in an aqueous nutrient medium containing ethyl thiolincosaminide in an effective amount ranging from more than incidental impurities up to 8 gm./liter of aqueous nutrient medium, under aerobic conditions until substantial activity is imparted to said medium by production of lincomycin K.

8. A process according to claim 7 which comprises isolating the lincomycin K so produced.

9. A process according to claim 7 wherein the aqueous nutrient medium contains ethyl thiolincosaminide in an effective amount ranging from more than incidental impurities of 0.25 gm./liter up to 8 gm./liter of aqueous nutrient medium.

10. A process according to claim 7 in which the cultivation is effected at a temperature of about 18° C. to about 37° C. for a period between about 2 to 10 days.

11. A process which comprises cultivating Streptomyces lincolnensis var. lincolnensis in an aqueous nutrient medium containing ethyl thiolincosaminide, in an effective amount ranging from more than incidental impurities of 0.25 gm./liter up to 8 gm./liter of aqueous nutrient medium, a source of assimilable carbohydrate and assimilable nitrogen under aerobic conditions until substantial activity is imparted to said medum by the producton of lincomycn K.

12. A process according to claim 11 which comprises isolating the lincomycin K so produced.

13. A process which comprises cultivating Streptomyces lincolnensis var. lincolnensis in an aqueous nutrient medium to which 2 gm./liter of ethyl thiolincosaminide is fed, under aerobic conditions until substantial activity is imparted to said medium by production of lincomycin K.

14. A process which comprises cultivating Streptomyces lincolnensis var. lincolnensis in an aqueous nutrient medium to which 2 gm./liter of ethyl thiolincosaminide is fed, a source of assimilable carbohydrate and assimilable nitrogen under aerobic conditions until substantial activity is imparted to said medium by the production of lincomycin K.

15. A process according to claim 13 which comprises isolating lincomycin K so produced.

16. A process according to claim 14 which comprises isolating the lincomycin K so produced.

References Cited

UNITED STATES PATENTS 3,086,912  4/1963  Bergy et al. _____ 167—65

ALBERT T. MEYERS, Primary Examiner.

D. STEPHENS, Assistant Examiner.

U.S. Cl. X.R.

167—65; 195—80; 260—326.84